United States Patent Office 2,941,895
Patented June 21, 1960

2,941,895

PIGMENTARY PRODUCT AND PROCESS FOR MAKING SAME

John H. Haslam, Landenberg, Pa., assignor to E. I. du Pont de Nemours and Company, Wilmington, Del., a corporation of Delaware No Drawing. Filed Sept. 11, 1956, Ser. No. 609,149

22 Claims. (Cl. 106—193)

This invention pertains to pigmentary materials. It more particularly concerns novel, flaky, metal oxide pigments and a process for preparing them.

Several pigmentary materials in flake form are known. The more common ones include the metal flakes, particularly aluminum, which are opaque but impart certain desirable properties to paints. Ground mica is such a material but is transparent and of low refractive index relative to the prime pigment materials such as zinc sulfide and titanium dioxide. A highly decorative pigment or filler is made from fish scales and is generally referred to as "pearl essence." After recovery, cleaning, etc. the pearl essence may be incorporated in coatings to give beautiful iridescent and pearlescent effects or, blended with other pigments and colors, to give a metallized effect. The natural fish scale product is rather difficult and expensive to process and hence the pearl essence is costly. Efforts have been made to find satisfactory but less expensive substitutes for pearl essence but none have heretofore been successful. None of the other known flakes such as mica or the metallic flakes give the same optical results.

An object of this invention is to provide a new flaky substance having a high light refractive effect and having the property of imparting a nacreous or pearlescent appearance to plastic materials in which they are incorporated. Another object is the production of this substance at a cost less than that of the fish-scale product and thereby promote greater use than is now possible with the fish-scale product. A further object is the production of novel flake compounds, particularly titanium compounds of high comparative durability, capable of use as a pigmentary material having special optical effects and highly stable, when used in paints, against temperatures normally used in baking procedures for the production of durable paints. Other objects will appear hereinafter.

The objects of the invention are attained by placing a film of hydrolyzable ester of a metal of the group IV-A of the periodic table and particularly a hydrolyzable ester of a titanium, zirconium or hafnium compound on a smooth surface, contacting and hydrolyzing the ester film with water vapor, and removing the resulting polymeric metal oxide hydrolyzate in the form of substantially transparent flakes.

In a preferred embodiment, this invention comprises placing a film of a non-aqueous solution of a group IV-A metal ester in a volatile solvent on a smooth solid surface, allowing the solvent to evaporate, contacting the metal ester film with water vapor, e.g., steam, and removing the resulting flakes from said surface.

In a variation of this invention, the group IV-A metal ester may be colored by admixture with varying amounts of organo-soluble esters or salts, e.g., chlorides, bromides or acetates, of metals forming on hydrolysis colored oxides, such as those of vanadium, chromium, manganese, iron, cobalt, and nickel.

Another form of this invention comprises the heating of the flakes, after their removal from the casting surface, at temperatures ranging from 200° C. to 1100° C. and, preferably, calcining in the range of 500 to 800° C. to convert the materials to a highly heat stable oxide form.

The esters, i.e., the organo metallates, of the acids of metals of group IV-A, e.g., titanic and zirconic acids, useful in the practice of this invention are, in their monomeric form, generally designated by the formula $M(OR)_4$ in which M is the metal of group IV-A and R is a hydrocarbon radical, preferably an alkyl radical having from one to eight carbon atoms and preferably three or four carbon atoms. The organic group of the metallate may, however, be aromatic or hydroaromatic as well as aliphatic, and, although it is preferred that the organic group be hydrocarbon, the broad invention contemplates radicals containing other substituents in the organic radical, e.g., chlorine.

Moreover, in addition to monomeric esters, the partially condensed esters resulting from the action of up to about one and one-half moles of water per one mole of a tetraalkyl ester of the acid of the group IV-A metal compound may also be used. Specific esters comprehended by the invention are tetraisopropyl titanate, tetraethyl titanate, tetrabutyl titanate, tetraoctyl titanate, cyclohexyl titanate, tetraallyl titanate, tetrabutyl zirconate, tetrahexyl zirconate, tetraphenyl zirconate, tetrabutyl hafnate and tetraphenyl hafnate, β-chloroethyl titanate and β-chloropropyl titanate. The partially condensed but still organo-soluble esters, which are of polymeric structure, may be prepared from any of the monomeric esters such as those listed above, in known fashion, as by the action of water on the ester as described above. Mixtures of the above metallates as well as metallates in which different kinds of hydrocarbon or substituted hydrocarbon radicals are present in the compound may be used.

The amount of the group IV-A metal alkyl ester applied to a given area may vary considerably. Too small a quantity results in an adherent film rather than the desired, easily removed flakes but this adhesion can be overcome to a certain extent by using heated water vapor before hydrolysis of the film is complete. Roughly the amount suitable for producing the flakes of this invention in good yield is that equivalent to from about 0.04 to 0.2 gram molecule of the group IV metal oxide, e.g., $TiO_2$ or $ZrO_2$ (calculated as $MO_2$, in which M is the metal, although combined in the form of an ester) per square meter of surface, depending upon which ester is used and the conditions of hydrolysis. These esters may be used alone or mixed with each other or with the various coloring compounds. Frequently, when oxygen-containing coloring compounds are used, considerably higher total oxides (calculated as oxides although either or both of the derivatives of the group IV-A metal and of the coloring compounds be combined in the form of esters) per unit area may be used.

The application of the ester film to the casting surface is conveniently done by means of solutions in anhydrous organic solvents. However, the undiluted esters (if liquid) or their mixtures with the coloring agents, may be applied to the surface, without solvent, in the desired amounts by spraying, wiping on or condensation of their vapors.

The metal compounds useful as coloring agents comprise the alkyl esters and salts of the previously mentioned colored oxide formers. Such esters include ethyl vanadate, isopropyl ferrate, tertiary butyl chromate; the salts include the various chlorides such as $FeCl_3$, $VCl_3$, $VOCl_3$, $CrCl_3$, $MnCl_2$, $CoCl_3$, $NiCl_2$, the corresponding acetates, etc. The corresponding bromides may also be used although they are not preferred because of cost but are useful when high solubility in common organic solvents is desired.

Numerous organic solvents may be used. They should be more volatile than the metal esters used and preferably have boiling points below 130° C. They should have solvent power sufficient to dissolve the desired amount of esters and other metal compounds used. Satisfactory are the hydrocarbon solvents such as hexane, cyclohexane, benzene, heptane and toluene, the aliphatic alcohols of from 2 to 8 carbons such as ethanol, butanol and the amyl alcohols, dioxane, acetone, and volatile esters such as ethyl acetate and butyl acetate. It is preferred that the organic ester solvents contain alcohol components of not more than eight carbon atoms and that any organic esters including those formed in use via ester interchange, be more volatile than the metal esters and preferably boil below about 130° C. at one atmosphere pressure. Solvents may be selected which will have desired solvent or other characteristics according to the specific metal compounds being employed.

The quantity of metal esters used in this process may vary within limits. The preferred range is approximately from a 10% to a 25% by weight solution of tetraisopropyl titanate, and solutions of the other esters containing amounts of $TiO_2$ or $ZrO_2$ molecularly equivalent thereto. The coloring metals (in the form of the compounds referred to above), calculated as atom percent of the metal, may be substituted for up to 50 atom percent of the group IV-A metals. In most cases where coloring is desired the coloring metals are present in the solution in minor amounts as compared with the group IV-A metal.

Several specific illustrations of this process (in which parts, proportions and percentages are by weight unless otherwise specified) are given in the following examples.

*Example I*

A 20% solution of tetra n-butyl titanate in cyclohexane was poured over a large glass plate held at a 45° angle and allowed to drain about 2 minutes. A jet of steam was then played quickly on the film which caused it to hydrolize, solidify and crack into small flakes which were then brushed from the glass surface. These flakes were lustrous and transparent. Several batches were made and collected. Cleaning of the plate between batches made the flakes easier to remove. The flakes were apparently stable in air; however, on heating overnight at 60° C. they lost 17% of their weight but retained the same lustrous, transparent appearance and were insoluble in hexane or ethanol although a considerable amount of butyl radical remained in the product as butyl polytitanate. Heating the freshly prepared flakes at 200° C. apparently caused charring of the residual organic matter and produced black flakes having the appearance of graphite. Heating in air at 400° C. for about 16 hours gave light colored flakes of anatase structure, the lighter color being apparently due to removal of carbon by high temperature oxidation. Calcining the 60° dried flakes for 3 hours at 800° C. caused a 35.5% loss in weight but the flakes were white and still lustrous, and had the rutile structure.

*Example II*

A 15% solution of tetraisopropyl titanate in normal heptane was poured over an inclined polished chromium plated brass sheet. After allowing about 2 minutes for partial draining and evaporation of solvent, air at 85% relative humidity and 25° C. was blown over the film for a few minutes. The clear film crazed and cracked into transparent flakes which could be removed by flexing and scraping the bare sheet. These flakes were white, transparent and lustrous when heated below 100° C. in air or when calcined in air at temperatures ranging from 600° C. to 1000° C.

*Example III*

Less than 1% of butyl ferrate was added to a 20% solution of butyl titanate in cyclohexane, and films of this solution were flowed on glass as in the above examples and exposed to 80% relative humidity air. Upon evaporation of solvent, the film crazed and was scraped off yielding transparent golden lustrous flakes. These flakes retained their color on drying at about 100° C. but on calcining at 600° C. they darkened.

*Example IV*

Example III was repeated with a solution to which was added 2% butyl ferrate based on the titanium ester. The resulting flakes were tan, and transparent. Upon calcining at 600° C., the flakes darkened.

*Example V*

Example III was repeated again using a portion of a 20% solution of butyl ferrate in equal volume to the 20% solution of butyl titanate used in Example III. Rich reddish brown lustrous flakes were obtained upon evaporation of the solvent. Calcination at 600° C. in air turned these flakes to a chocolate color.

*Example VI*

A solution of $CrCl_3$ in butanol containing 12.7 g./liter of Cr (calculated as the metal) was prepared. 200 ml. of this solution was mixed with 200 ml. of a 20% solution of butyl titanate in butanol. This mixed solution was poured onto a sloping glass plate and, after a minute's draining, was then contacted with steam. The residual film cracked into transparent, lustrous green flakes which were loose and readily removed from the plate. On drying at 100° C. they were transparent, stable and insoluble in common solvents. Calcination at 600° C. turned them chocolate brown.

Incorporation of the flakes of this invention into paints, lacquers and enamels and the formation of finishes therefrom, are illustrated in the following examples.

*Example VII*

1 part by weight of the titania flakes prepared by calcination at 800° C. by the procedure of Example I, was made into a paint by mixing with 5 parts of alkyd resin solution containing 60% solids in petroleum spirits and sold as General Electric Glyptal solution No. 2502, and by rubbing together on a glass plate with a spatula. The alkyd resin comprises as components, i.e. combined chemically, about 57% soya acids, 27% phthalic anhydride, and about 13% pentaerythritol and glycerine. The resulting paint was applied in a film to glass and metal surfaces. The dried film was white and, by light reflectance from individual flakes, exhibited a pearlescent appearance.

*Example VIII*

2 parts of the uncalcined green flakes prepared and dried at 100° C. by the procedure of Example VI were mixed, as in Example VII, with 5 parts of a nitrocellulose lacquer formulated as follows:

15 parts by weight of ½ second cellulose nitrate (35% ethyl alcohol)
5 parts by weight of dibutyl phthalate
14 parts by weight of ethyl acetate
88 parts by weight of butyl alcohol
255 parts by weight of toluol
50 parts by weight of 4-lb. cut refined shellac The resulting mixture was thinned slightly with ethyl acetate to a brushing consistency and brushed onto a clear aluminum panel. The resulting coating had a semi-transparent yet lustrous and somewhat pearlescent appearance and a stable green color.

*Example IX*

The reflectance and consequent nacreous or lustrous property of the final colored coatings of this invention can be enhanced by mixing from 10% to 90% (based on total flakes used) of calcined white flakes with uncalcined colored flakes. Thus when the paint of Example VIII is modified by using one part of the calcined TiO₂ flakes of Example VII together with one part of the uncalcined colored flakes of Example VIII instead of 2 parts of the colored flakes alone, the dried coating has a more nacreous appearance than where the uncalcined colored flakes were used.

The use of the calcined white TiO₂ flakes is preferred, either alone or in combination with other flakes of this invention, since they appear to impart a more pronounced pearlescent effect to coatings containing them, than in the case of other flakes made in accordance with this invention.

Although the above examples are directed to the use of titanium compounds as the base for the flakes of this invention, it will be understood that the invention is likewise applicable to the corresponding zirconium and hafnium compounds. In the step of this invention wherein the film is caused to craze and separate into loose flakes, it is preferable to use heated water vapor such as steam, or water vapor mixed with air or other diluent gases at somewhat elevated temperatures, e.g. from 50 to 200° C. It is preferable also to apply this water vapor after substantial evaporation (by non-humid hot air) of solvent used but before substantial hydrolysis of the alkyl metallate due to contact with atmospheric moisture has occurred. Although, in the case of applying relatively thick films, simple exposure to normally humid air will result in flakes, the use of warm humid vapor gives more consistent and greater yields of the desired flakes.

The initial flakes obtained as a result of this process are clear, transparent and lustrous when made solely from the titanium, zirconium, or hafnium esters. The initial flakes and those heated at temperatures up to 100° C. are not pure metal dioxides but comprise polymeric oxidic hydrolyzates containing an appreciable amount of residual organic matter or water. Nevertheless, they are stable and insoluble enough to incorporate into plastics or paints by the usual mixing and grinding procedures such as on paint roll mills. The flakes are mechanically quite strong, and are generally insoluble in hydrocarbons or other commonly used solvents, the better ones having a thickness of over one micron up to ten microns and having width and length of the order of from 100 microns to as much as a quarter of an inch. Surprisingly, they do not crumble extensively on heating to the higher temperatures when they are reduced to the substantially pure metal oxide e.g., TiO₂, but retain the marked luster and develop the high refractive index which makes them unique among pigments. The addition of the coloring metal compounds to the essential fourth group metal oxide does not impair the surface luster, and a large degree of transparency of the uncalcined colored flake is retained. The flake form remains after calcining, and luster persists to a considerable degree when the colored flakes are calcined. The uncalcined colored flakes are quite attractive for general use and possess the necessary stability and insolubility for use in paints and plastics. The use of the metals of group IV-A, e.g., the alkyl titanates, zirconates and hafnates, appears to be essential to the formation of clear stable flakes although relatively large amounts of coloring metal compounds may be admixed with them with success.

The flakes produced on the casting surface by the action of the water vapor result from the hydrolysis and polymerization of the organo-metallates. For example, in the case of tetratisopropyl titanate the initial ester is hydrolyzed by water vapor and condensed by the elimination of isopropanol through occurrence of concurrent reactions indicated in the following equations:

(I) $Ti(OC_3H_7)_4 + H_2O \rightarrow TiOH(OC_3H_7)_3 + C_3H_7OH$ (II) $Ti(OH)(OC_3H_7)_3 + Ti(OC_3H_7)_4$
$\rightarrow (C_3H_7O)_3TiO \cdot Ti(OC_3H_7)_3 + C_3H_7OH$ The product of Equation II, hexaisopropyl dititanate, will also enter similar reactions with water and the intermediate isopropyl hydroxy titanates to yield higher isopropyl polytitanates insoluble in organic solvents, which are transparent solids and form the initial flakes of this invention. Calcination of these organopolymetallates in air as shown in the examples result in polymeric oxides, also called polyoxides, such as TiO₂, which at higher temperatures are transformed to the crystalline state.

The colored products, when the coloring metals are present as organo-metallates, e.g., esters, may result from cohydrolysis and copolymerization of the various organo-metallates present in the system. By the time these condensation reactions have proceeded to give an insoluble product, the product is believed to be a heteropolymetallate of the metals present which, on further hydrolysis and condensation, becomes a heteropolyoxide. However, cohydrolysis and copolymerization are not essential for the development of color in the flake. For example, certain colored compounds such as chromic chloride are not readily hydrolized but, nevertheless, act as coloring agents in the flake.

The colored flakes are preferably made from mixtures of esters. However, organo-soluble salts of the coloring metals may be used, and, if desired, the flakes may be washed with water or dilute alkaline solutions such as ammonia to remove residual chloride or acids.

The transparency of the flakes as described herein represents a marked difference as compared with metallic flakes which are non-transparent.

Normally, the flakes of this invention, prior to incorporation into a film-forming or plastic composition, are ground, according to the normal technique in the paint industry applicable to flake pigments, to a mesh size of 20-1000 microns, preferably 40-500 microns with the major portion of the flakes being within a small median portion of the latter preferred range. This may be effected by grinding, triturating or otherwise, followed by classifying, screening, etc., to insure the desired degree of uniform size without, to any substantial degree, destroying the flaky nature and the aesthetic appearance of the new flaky products.

The selection of the particle size of the flakes and their maintenance within a given mesh size is, however, a matter of preference, depending on the particular application involved.

In addition to plastic-containing coating compositions such as paints, lacquers, varnishes and enamels, to which the flakes of this invention are admirably adapted, it will be understood that the flakes of this invention may be widely used for the modification of various other types of plastics, e.g. molded plastics, in various forms, sizes and shapes of articles. For example, they may be used in melt extrusion processes, in the manufacture of artificial pearls, in the manufacture of self-sustaining films, in various forms of cast and molded articles and in a wide variety of finishes.

Any modification or variation of the invention including or in addition to the above description which conforms to the spirit and principle of the invention, is intended to be included with the claims.

I claim as my invention:

1. The process which comprises applying to a smooth surface a liquid film of a hydrolyzable organic ester of a metal of group IV-A of the periodic table, in which the organic radical of said ester is selected from the group consisting of aliphatic, aromatic and hydroaromatic organic radicals, having a carbon chain composed of from 1-8 carbon atoms in an amount equivalent to 0.04 to 0.2 gram molecules of the oxide of the group IV-A metal of said compound per square meter of surface, and thereafter treating the film with water vapor whereby to effect hydrolysis of said film into solid flakes.

2. The process of claim 1 characterized in that said hydrolyzable organic ester is an alkyl ester.

3. The process of claim 1 characterized in that said liquid film contains a coloring metal compound selected from the group consisting of organo-soluble metal esters and organo-soluble metal salts of metals forming colored oxides on hydrolysis.

4. The process of claim 1 in which the flakes are separated from the surface, collected, and calcinated at a temperature between 200°–1100° C.

5. The process of claim 1 in which the flakes are separated from the surface, collected, and then incorporated into a plastic.

6. The process of claim 1 in which the flakes are separated from the casting surface, collected, transformed into flakes of small size and incorporated into a plastic.

7. Small, thin, flat lustrous flakes of an oxygen-containing compound of a metal of group IV–A of the periodic table derived from the hydrolysis of a film of an organic ester of said metal in which the organic radical of said ester is selected from the group consisting of aliphatic, aromatic and hydroaromatic organic radicals having a carbon chain composed of from 1–8 carbon atoms.

8. The product of claim 7 wherein said flakes contain a colored metal oxide.

9. Small, thin, flat, substantially transparent, lustrous flakes of an organo-polymetallate of a metal of group IV–A of the periodic table derived from the hydrolysis of a film of an organic ester of said metal in which the organic radical of said ester is selected from the group consisting of aliphatic, aromatic and hydroaromatic organic radicals having a carbon chain composed of from 1–8 carbon atoms.

10. The product of claim 9 wherein said flakes contain a colored metal oxide.

11. Small, thin, flat, lustrous flakes of a polyoxide of a metal of group IV–A of the periodic table derived from the calcination between 200–1100° C. of the hydrolysis product of a film of an organic ester of said metal in which the organic radical of said ester is selected from the group consisting of aliphatic, aromatic and hydroaromatic organic radicals having a carbon chain composed of from 1–8 carbon atoms, said flakes being highly light refractive.

12. The product of claim 11 wherein said flakes contain therein a colored metal oxide.

13. Small, thin, flat, lustrous flakes of titanium dioxide derived from the calcination between 200–1100° C. of the hydrolysis product of a film of an organic ester of titanium in which the organic radical of said ester is selected from the group consisting of aliphatic, aromatic and hydroaromatic organic radicals having a carbon chain composed of from 1–8 carbon atoms, said flakes being highly light refractive.

14. The product of claim 13 wherein said flakes contain therein a colored metal oxide.

15. A composition comprising a plastic containing distributed therein small, thin, flat, lustrous flakes of an oxygen-containing compound of a metal of group IV–A of the periodic table derived from the hydrolysis of a film of an organic ester of said metal in which the organic radical of said ester is selected from the group consisting of aliphatic, aromatic and hydroaromatic organic radicals having a carbon chain composed of from 1–8 carbon atoms.

16. The composition of claim 15 wherein said flakes contain a colored metal oxide.

17. A composition comprising a plastic containing distributed therein small, thin, flat, substantially transparent, lustrous flakes of an organo-polymetallate of a metal of group IV–A of the periodic table derived from the hydrolysis of a film of an organic ester of said metal in which the organic radical of said ester is selected from the group consisting of aliphatic, aromatic and hydroaromatic organic radicals having a carbon chain composed of from 1–8 carbon atoms.

18. The composition of claim 7 wherein said flakes contain a colored metal oxide.

19. A composition comprising a plastic containing distributed therein small, thin, flat, lustrous flakes of a polyoxide of a metal of group IV–A of the periodic table derived from the calcination between 200–1100° C. of the hydrolysis product of a film of an organic ester of said metal in which the organic radical of said ester is selected from the group consisting of aliphatic, aromatic and hydroaromatic organic radicals having a carbon chain composed of from 1–8 carbon atoms, said flakes being highly light refractive.

20. The composition of claim 19 wherein said flakes contain a colored metal oxide.

21. A composition comprising a plastic containing distributed therein small, thin, flat, lustrous flakes of titanium dioxide derived from the calcination between 200–1100° C. of the hydrolysis product of a film of an organic ester of titanium in which the organic radical of said ester is selected from the group consisting of aliphatic, aromatic and hydroaromatic organic radicals having a carbon chain composed of from 1–8 carbon atoms, said flakes being highly light refractive.

22. The composition of claim 21 wherein said flakes contain a colored metal oxide.

References Cited in the file of this patent

UNITED STATES PATENTS

| | | |
|---|---|---|
| 1,607,624 | Higgins | Nov. 23, 1926 |
| 1,906,148 | Gardner | Apr. 25, 1933 |
| 1,922,548 | Mattin | Aug. 15, 1933 |
| 1,982,280 | Bell | Nov. 27, 1934 |
| 2,231,455 | Schaumann | Feb. 11, 1941 |
| 2,311,533 | Gertzog et al. | Feb. 16, 1943 |
| 2,363,570 | Caprio | Nov. 28, 1944 |
| 2,708,205 | Haslam | May 10, 1955 |

FOREIGN PATENTS

| | | |
|---|---|---|
| 455,717 | Great Britain | Oct. 27, 1936 |

OTHER REFERENCES

Article by Dr. Max Kronstein on "Alkyl Titanates," pages 10–13, 20 and 21 of the Paint and Varnish Production, August 1950.

UNITED STATES PATENT OFFICE
CERTIFICATE OF CORRECTION

Patent No. 2,941,895

June 21, 1960

John H. Haslam

It is hereby certified that error appears in the printed specification of the above numbered patent requiring correction and that the said Letters Patent should read as corrected below.

Column 1, line 64, after "said surface." insert the following paragraph:

> A more specific embodiment of the invention comprises placing the metal ester-solvent film on a smooth surface such as glass or polished metal, and impinging on the surface of the film a stream of gas containing at least 25 volume percent of water vapor until substantially complete evaporation of solvent occurs accompanied by hydrolysis and crazing of the metal ester residue, and then shaking, brushing or scraping the resulting flakes from the supporting surface. Steam flowed gently over and in contact with the film, acts as an excellent hydrolyzing agent.

Signed and sealed this 18th day of April 1961.

(SEAL)
Attest:

ERNEST W. SWIDER
Attesting Officer

DAVID L. LADD
Commissioner of Patents